(12) United States Patent
Agrawal et al.

(10) Patent No.: US 8,867,999 B2
(45) Date of Patent: Oct. 21, 2014

(54) DOWNLINK INTERFERENCE CANCELLATION METHODS

(75) Inventors: Avneesh Agrawal, San Diego, CA (US); Peter Gaal, San Diego, CA (US); Ravi Palanki, San Diego, CA (US); Alexei Y. Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1027 days.

(21) Appl. No.: 12/437,362

(22) Filed: May 7, 2009

(65) Prior Publication Data

US 2010/0190447 A1 Jul. 29, 2010

Related U.S. Application Data

(60) Provisional application No. 61/147,411, filed on Jan. 26, 2009, provisional application No. 61/147,615, filed on Jan. 27, 2009.

(51) Int. Cl.
*H04B 1/00* (2006.01)

(52) U.S. Cl.
USPC .......................................... 455/63.1; 455/296

(58) Field of Classification Search
USPC .................................................. 455/63.1, 296
IPC ........................................................ H04B 1/00
See application file for complete search history.

(56) References Cited

U.S. PATENT DOCUMENTS

| | | | |
|---|---|---|---|
| 6,167,270 A | 12/2000 | Rezaiifar et al. | |
| 7,190,964 B2 | 3/2007 | Damnjanovic et al. | |
| 7,218,894 B2 * | 5/2007 | Schmidl et al. | 455/67.11 |
| 7,248,841 B2 | 7/2007 | Agee et al. | |
| 7,254,158 B2 | 8/2007 | Agrawal | |
| 7,428,269 B2 | 9/2008 | Sampath et al. | |

(Continued)

FOREIGN PATENT DOCUMENTS

| | | |
|---|---|---|
| CN | 1424863 A | 6/2003 |
| CN | 1741423 A | 3/2006 |

(Continued)

OTHER PUBLICATIONS

"3GPP TR 25.814 V1.5.0; 3rd Generation Partnership Project; Technical Specification Group Radio Access Network; Physical Layer Aspects for Evolved UTRA (Release 7)" Internet Citation May 27, 2006, pp. 1-125, XP002574055, Citing generally to the entire document, and specifically to sections 7.1.2.6 and 7.1.2.6.2.

(Continued)

*Primary Examiner* — Patricia Nguyen
(74) *Attorney, Agent, or Firm* — Larry Moskowitz

(57) ABSTRACT

A method to mitigate interference in a wireless system is provided. The method includes processing a set of radio network identifiers and limiting a number of hypotheses associated with the radio network identifiers in order to mitigate interference in a wireless network. In another aspect, the method includes processing a set of hypotheses and limiting the set of hypotheses by limiting a number of downlink grants to a common space, limiting the number of downlink grants to a number of instances, or limiting the number of grants to a physical downlink control channel (PDCCH) type. In yet another aspect, the method includes processing a downlink set and generating a target termination level for the downlink data set, the termination level associated with a Hybrid automatic repeat-request.

54 Claims, 9 Drawing Sheets

(56) References Cited

U.S. PATENT DOCUMENTS

| | | | |
|---|---|---|---|
| 7,477,622 B2 | 1/2009 | Attar et al. | |
| 7,548,760 B2 | 6/2009 | Vasudevan et al. | |
| 7,822,385 B2* | 10/2010 | Lopez | 455/63.1 |
| 7,949,005 B2 | 5/2011 | Li et al. | |
| 8,023,955 B2* | 9/2011 | Anderson | 455/450 |
| 8,064,837 B2* | 11/2011 | Sampath | 455/63.1 |
| 8,160,013 B2 | 4/2012 | Kim et al. | |
| 8,194,598 B2 | 6/2012 | Attar et al. | |
| 8,229,365 B2* | 7/2012 | Westerberg et al. | 455/67.11 |
| 8,521,089 B2 | 8/2013 | Lin et al. | |
| 8,526,963 B2 | 9/2013 | Ji et al. | |
| 2002/0044614 A1 | 4/2002 | Molnar et al. | |
| 2003/0128679 A1 | 7/2003 | Ishiguro et al. | |
| 2004/0192208 A1 | 9/2004 | Kong et al. | |
| 2006/0092972 A1 | 5/2006 | Petrovic et al. | |
| 2006/0203794 A1 | 9/2006 | Sampath et al. | |
| 2006/0203891 A1 | 9/2006 | Sampath et al. | |
| 2007/0010957 A1 | 1/2007 | Sampath et al. | |
| 2007/0011550 A1 | 1/2007 | Agrawal et al. | |
| 2007/0040704 A1 | 2/2007 | Smee et al. | |
| 2007/0060057 A1 | 3/2007 | Matsuo et al. | |
| 2007/0060061 A1* | 3/2007 | Sampath | 455/63.1 |
| 2007/0183451 A1 | 8/2007 | Lohr et al. | |
| 2007/0189231 A1 | 8/2007 | Chang et al. | |
| 2007/0248052 A1 | 10/2007 | Nagaraj et al. | |
| 2007/0280175 A1 | 12/2007 | Cheng et al. | |
| 2008/0069074 A1 | 3/2008 | Shin et al. | |
| 2008/0170638 A1 | 7/2008 | Schmidl et al. | |
| 2009/0154620 A1* | 6/2009 | Mostafa | 375/346 |
| 2009/0196162 A1 | 8/2009 | Sambhwani et al. | |
| 2009/0254790 A1 | 10/2009 | Pi et al. | |
| 2009/0264142 A1 | 10/2009 | Sankar et al. | |
| 2009/0286482 A1* | 11/2009 | Gorokhov et al. | 455/63.1 |
| 2010/0008294 A1* | 1/2010 | Palanki et al. | 370/328 |
| 2010/0009634 A1 | 1/2010 | Budianu et al. | |
| 2010/0009705 A1 | 1/2010 | Budianu et al. | |
| 2010/0011269 A1 | 1/2010 | Budianu et al. | |
| 2010/0069010 A1 | 3/2010 | Karakayali et al. | |
| 2010/0080323 A1 | 4/2010 | Mueck et al. | |
| 2010/0099449 A1* | 4/2010 | Borran et al. | 455/501 |
| 2010/0222063 A1 | 9/2010 | Ishikura et al. | |
| 2010/0235704 A1 | 9/2010 | Gunnarsson et al. | |
| 2010/0265862 A1 | 10/2010 | Choi et al. | |
| 2011/0041027 A1 | 2/2011 | Fong et al. | |

FOREIGN PATENT DOCUMENTS

| | | |
|---|---|---|
| EP | 1318613 A2 | 6/2003 |
| JP | 6268628 A | 9/1994 |
| JP | 2000152332 A | 5/2000 |
| JP | 2002209253 A | 7/2002 |
| JP | 2003174400 A | 6/2003 |
| JP | 2007049998 A | 3/2007 |
| JP | 2009506652 A | 2/2009 |
| RU | 2233037 | 7/2004 |
| TW | 240364 | 2/1995 |
| TW | 419922 B | 1/2001 |
| TW | I497341 | 8/2002 |
| WO | WO2004036768 | 4/2004 |
| WO | 2007015466 A1 | 2/2007 |
| WO | WO2007024895 | 3/2007 |
| WO | 2007049998 A1 | 5/2007 |
| WO | WO2007108751 | 9/2007 |
| WO | WO2008036280 | 3/2008 |
| WO | WO2008058112 | 5/2008 |

OTHER PUBLICATIONS

International Search Report & Written Opinion—PCT/US2009/045200, International Search Authority—European Patent Office—May 28, 2010.

QUALCOMM Europe: "UTRAN enhancements for the support of inter-cell interference cancellation" 3GPP Draft; R3-080069 UTRAN Enhancements for the Support of Inter-Cell Interference Cancellation, 3rd Generation Partnership Project (3GPP), Mobile Competence Centre ; 650, Route Des Lucioles ; F-06921 Sophia-Antipolis Cedex ; France, vol . RAN WG1, No. Shenzhen, China; 20080319, Mar. 19, 2008, XP050110087.

Ritt et al: "TP on uplink inter-cell interference cancellation" 3GPP Draft; R1-060418, 3rd Generation Partnership Project (3GPP), Mobile Competence Centre ; 650, Route Des Lucioles ; F-06921 Sophia-Antipolis Cedex ; France, vol . RAN WG1, No. Denver, USA; 20060209, Feb. 9, 2006, XP050101362 [retrieved on Feb. 2, 2006] the whole document.

3GPP TR 25.814 VI.2.0, 3rd Generation Partnership Project, Technical Specification Group Radio Access Network, Physical Layer Aspects for Evolved UTRA (Release 7 ), Internet Citation, Feb. 1, 2006, XP002400401, Retrieved from the Internet: URL: http://www.3gpp.org/ftp/Specs/html—info/25814.htm [retrieved on Sep. 26, 2006].

International Search Report and Written Opinion—PCT/US2009/045195, International Search Authority—European Patent Office—Mar. 24, 2011.

Vodafone Group et al., "MDC & Cell Interference control in eHSPA architecture", 3GPP Draft, R3-071611, 3rd Generation Partnership Project (3GPP), Mobile Competence Centre , 650, Route Des Lucioles , F-06921 Sophia- Antipolis Cedex , France, vol. RAN WG3, No. Athens, Greece, 20070817, Aug. 17, 2007, XP050162420, [retrieved on Aug. 17, 2007].

Taiwan Search Report—TW098117348—TIPO—Sep. 26, 2012.

3GPP TR 25.814 v1.4.0, (May 2006), "3rd Generation Partnership Project; Technical Specification Group Radio Access Network; Physical Layer Aspects for EVolved UTRA (Release 7)", pp. 1-121.

* cited by examiner

APPARATUS 902

MEANS FOR RECEIVING A WIRELESS TRANSMISSION FROM AN INTERFERING BASE STATION 904

MEANS FOR ACCESSING A CONSTRAINED SET OF AVAILABLE PARAMETERS USED BY THE INTERFERING BASE STATION TO GENERATE THE TRANSMISSION 906

MEANS FOR DECODING THE TRANSMISSION USING A PLURALITY OF HYPOTHESES BASED UPON THE CONSTRAINED SET OF PARAMETERS 908

FIG. 10

APPARATUS 1002

MEANS FOR ACCESSING A CONSTRAINED SET OF AVAILABLE DOWNLINK SCHEDULING PARAMETERS 1004

MEANS FOR ENCODING A DOWNLINK CHANNEL USING A SELECTED ONE OF THE CONSTRAINED SET OF AVAILABLE DOWNLINK SCHEDULING PARAMETERS ASSIGNED TO A TARGET WIRELESS DEVICE 1006

MEANS FOR WIRELESSLY UNICASTING THE ENCODED DOWNLINK CHANNEL 1008

FIG. 11

DOWNLINK INTERFERENCE CANCELLATION METHODS

CLAIM OF PRIORITY UNDER 35 U.S.C. §119

The present Application for Patent claims priority to Provisional Application No. 61/147,411 filed Jan. 26, 2009 and to Provisional Application No. 61/147,615 filed Jan. 27, 2009, both entitled "Inter-cell Interference Cancellation Framework", both assigned to the assignee hereof and hereby expressly incorporated by reference herein in their entirety.

CROSS REFERENCE TO RELATED APPLICATIONS

The present Application is related to co-pending and commonly assigned U.S. patent application Ser. No. 12/437,334 entitled "Inter-Cell Interference Cancellation Framework" filed on even date herewith, which in turn claims priority to Provisional Application No. 61/080,051, entitled "Systems and Methods for Uplink Inter-cell Interference Cancellation Using Hybrid Automatic Repeat Request (HARQ) Retransmissions," filed Jul. 11, 2008, the disclosures of both of which are hereby expressly incorporated by reference in their entirety.

The present Application is related to co-pending and commonly assigned U.S. patent application Ser. No. 12/437,342 entitled "Inter-Cell Interference Cancellation Framework" filed on even date herewith, which in turn claims priority to Provisional Application No. 61/080,051, entitled "Systems and Methods for Uplink Inter-cell Interference Cancellation Using Hybrid Automatic Repeat Request (HARQ) Retransmissions," filed Jul. 11, 2008, the disclosures of both of which are hereby expressly incorporated by reference in their entirety.

The present Application is related to co-pending and commonly assigned U.S. patent application Ser. No. 12/437,355 entitled "Systems and Methods for Uplink Inter-cell Interference Cancellation Using Hybrid Automatic Repeat Request (HARQ) Retransmissions" filed on even date herewith, which in turn claims priority to Provisional Application No. 61/080,051 of the same title filed Jul. 11, 2008, the disclosures of both of which are hereby expressly incorporated by reference in their entirety.

BACKGROUND

I. Field

The following description relates generally to wireless communications systems, and more particularly to methods for mitigating downlink interference.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the base nodes (Node-B's) and Radio Network Controllers (RNC) which make up the UMTS core network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers. The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

Third Generation Partnership Project (3GPP) LTE (Long Term Evolution) is the name given to a project within the 3GPP to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

In a traditional homogeneous deployment, an UE typically connects to the cell with the highest geometry (i.e., signal to noise ratio). However, in a heterogeneous deployment, there are benefits in allowing the UE to connect to a weaker base station. For example, an UE may connect to the cell with the lowest path loss to minimize interference caused to the network, even though its geometry is lower. Similarly, in the case of restricted association, an UE may be forced to connect to a weaker geometry base station as it may not have permission to access the strongest geometry base station. However, this situation can create interference of sufficient strength that mitigation is necessary in order to receive a serving signal.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

In accordance with one or more aspects and corresponding disclosure thereof, various aspects are described in connection with reducing a number of blind hypotheses required for a wireless device such as user equipment (e.g., access terminal, wireless device, cellular device, etc.) to decode a downlink scheduled transmission (e.g., control channel, traffic channel, etc.).

In one aspect, a method is provided for mitigating interference in a wireless communication system by receiving a wireless transmission from an interfering base station, accessing a constrained set of available parameters used by the interfering base station to generate the transmission, and decoding the transmission using a plurality of hypotheses based upon the constrained set of parameters.

In an additional aspect, a computer program product is provided for mitigating interference in a wireless communication system. A computer-readable storage medium comprises a set of codes for causing a computer to receive a wireless transmission from an interfering base station. A set of codes causes the computer to access a constrained set of available parameters used by the interfering base station to generate the transmission. A set of codes causes the computer to decode the transmission using a plurality of hypotheses based upon the constrained set of parameters.

In another aspect, an apparatus is provided for mitigating interference in a wireless communication system. Means are provided for receiving a wireless transmission from an interfering base station. Means are provided for accessing a constrained set of available parameters used by the interfering base station to generate the transmission. Means are provided for decoding the transmission using a plurality of hypotheses based upon the constrained set of parameters.

In a further aspect, an apparatus is provided for mitigating interference in a wireless communication system. A receiver receives a wireless transmission from an interfering base station. A computing platform accesses a constrained set of available parameters used by the interfering base station to generate the transmission. A decoder decodes the transmission using a plurality of hypotheses based upon the constrained set of parameters.

In yet one aspect, a method is provided for enabling a wireless device to mitigate interference in a wireless communication system by accessing a constrained set of available parameters, encoding a transmission using a selected one of the constrained set of available parameters assigned to a target wireless device, wirelessly unicasting the transmission, wherein another wireless device receiving the encoded downlink channel as interference decodes the interfering signal using a plurality of hypotheses based upon the constrained set of downlink scheduling parameters and cancels the interfering signal in order to decode a target signal.

In yet an additional aspect, a computer program product is provided for enabling a wireless device to mitigate interference in a wireless communication system. A computer-readable storage medium comprises a set of codes for causing a computer to access a constrained set of available parameters. A set of codes causes the computer to encode a transmission using a selected one of the constrained set of available parameters assigned to a target wireless device. A set of codes causes the computer to wirelessly unicast the encoded transmission, wherein the constrained set of parameters is selected to be sufficient for a non-served user equipment (UE) to decode the transmission using a plurality of hypotheses based upon the constrained set of resources.

In yet another additional aspect, an apparatus is provided for enabling a wireless device to mitigate interference in a wireless communication system. Means are provided for accessing a constrained set of available parameters. Means are provided for encoding a transmission using a selected one of the constrained set of available parameters assigned to a target wireless device. Means are provided for wirelessly unicasting the encoded transmission, wherein the constrained set of parameters is selected to be sufficient for a non-served user equipment (UE) to decode the transmission using a plurality of hypotheses based upon the constrained set of resources.

In yet a further aspect, an apparatus is provided for enabling a wireless device to mitigate interference in a wireless communication system. A computing platform accesses a constrained set of available parameters. An encoder encodes a transmission using a selected one of the constrained set of available parameters assigned to a target wireless device. A transmitter wirelessly unicasts the encoded transmission, wherein the constrained set of parameters is selected to be sufficient for a non-served user equipment (UE) to decode the transmission using a plurality of hypotheses based upon the constrained set of resources.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIG. 10 depicts a block diagram of an apparatus having means for mitigating interference cancellation in a wireless communication system.

FIG. 11 depicts a block diagram of an apparatus having means for enhancing interference cancellation in a wireless communication system.

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well-known structures and components are shown in block diagram form in order to avoid obscuring the concepts of the invention.

Figure 1:
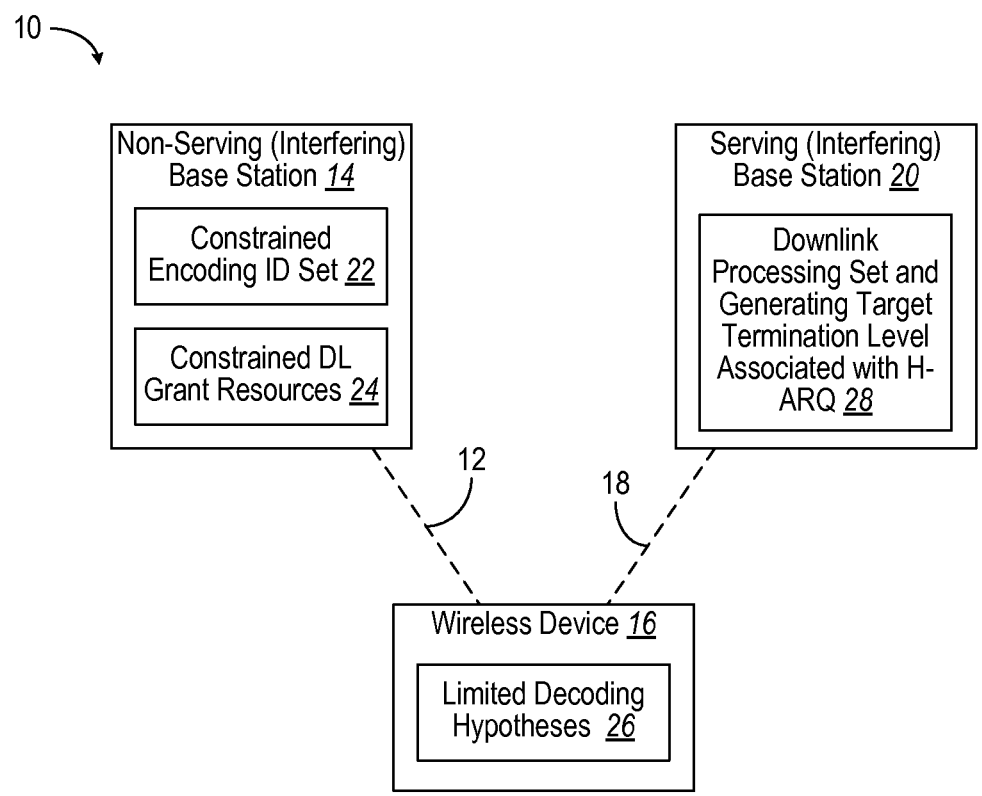
FIG. 1 is a high level block diagram of a system that performs interference mitigation by decoding and cancelling an interfering signal.

Referring initially to FIG. 1, a wireless communication system 10 provides systems and methods to reduce downlink interference 12 from a non-serving (interfering) base station 14 at a wireless device 16 that is being served data packet communications over a wireless network 18 from a serving base station 20. In one aspect, the non-serving base station 14 conforms to a constrained, reduced set of scrambling/encoding radio network identifiers 22 for target wireless devices (not shown). Advantageously, the non-serving base station 14 also conforms to constrained downlink grant resources 24 to a common space (e.g., number of instances, type of control channel). Thereby, the wireless device 16 can mitigate interference in the wireless communication system 18 by processing a manageable number of decoding hypotheses 26 associated with the constrained radio network identifiers and constrained downlink grant resources. In yet another aspect, the serving base station 20 processes a downlink set and generates a target termination level for the downlink data set, as depicted at 28. The termination level is associated with a Hybrid Automatic Repeat-Request (HARQ)

Figure 2:
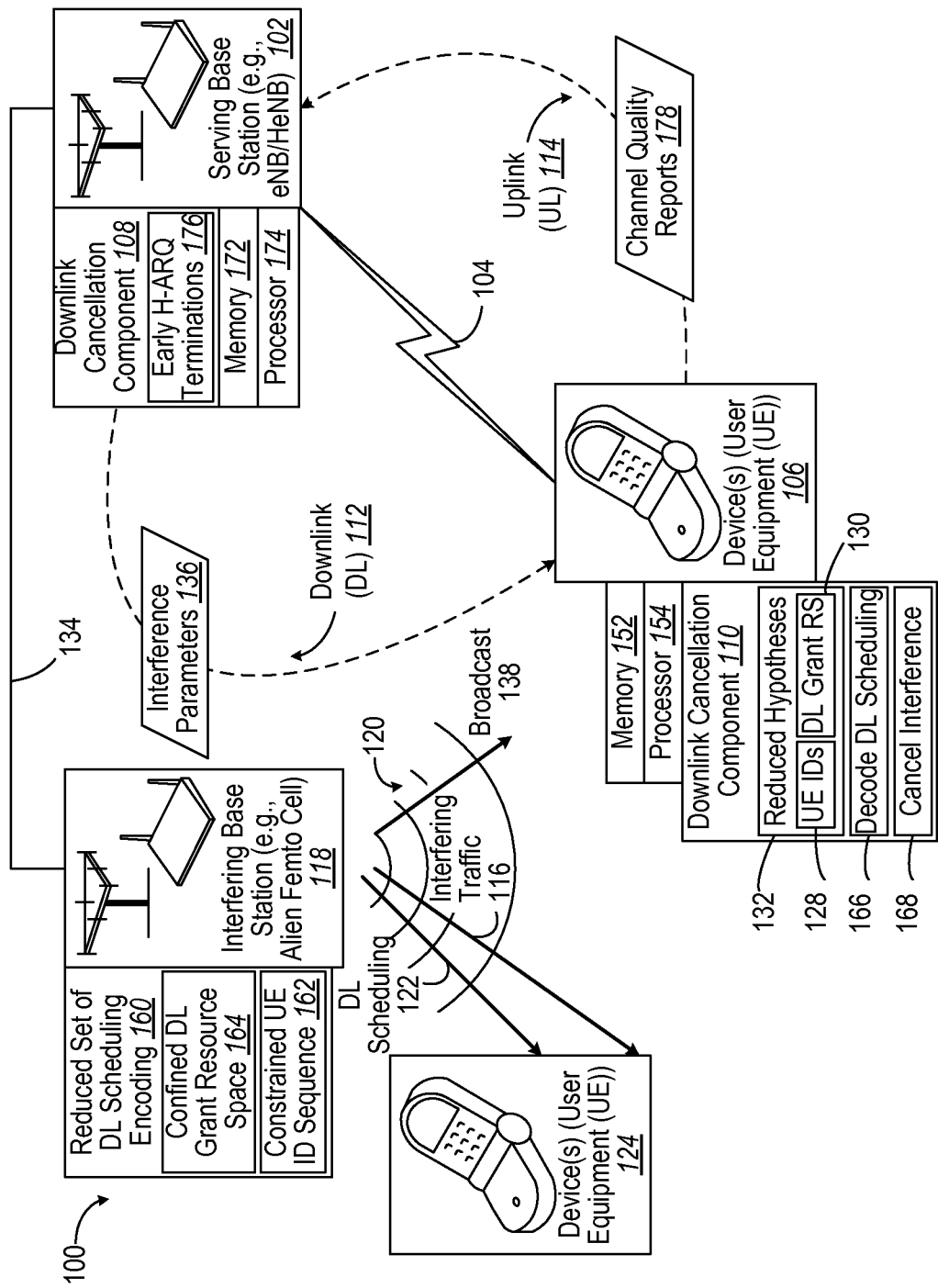
FIG. 2 is a diagram of a wireless communication system of base stations and user equipment performing interference mitigation by decoding and cancelling an interfering signal by constraining downlink scheduling options.

Referring now to FIG. 2, a network 100 includes one or more base stations 102 (also referred to as a node, evolved node B—eNB, serving eNB or target eNB) which can be an entity capable of communication over a wireless network (air link) 104 to a second device 106 (or devices). For instance, each device 106 can be an access terminal (also referred to as terminal, user equipment, mobility management entity (MME) or mobile device). The components 102 and 106 can include a downlink cancellation component 108 and 110 respectively, where the cancellation component is provided to mitigate downlink interference across the network 100. As shown, the base station 102 communicates to the device 106 via downlink 112 and receives data via uplink 114. Such designation as uplink and downlink is arbitrary as the device 106 can also transmit data via downlink and receive data via uplink channels. It is noted that although two components 102 and 106 are shown, that more than two components can be employed on the network 104, where such additional components can also be adapted for enhanced interference cancellation as described herein.

Downlink interference cancellation can improve cell edge performance especially in severely interference-limited scenarios where interfering signals (e.g., traffic) 116 from a non-serving (e.g., alien or interfering) base station 118 can be stronger than the serving signal, depicted as downlink 112. This situation may occur in the standard WWAN (Wireless Wide Area Network) deployments. For example, this situation can arise in the presence of asymmetric downlink/uplink channel strength when server selection is biased towards a better uplink as well as in some cases of delayed handoff, wherein downlink interference cancellation may help to prevent connection drop. Another scenario is femto-cell deployments (e.g., home eNB ("HeNB") deployments in LTE) with a Closed Subscriber Group (CSG) where the device (e.g., UE) 106 can connect to the base station (e.g., HeNB) 102 of the associated CSG. In a typical residential deployment, the UE 106 can connect to its local HeNB 102 and may experience a severe interference when it is substantially closer to the neighbor's HeNB 118, where proximity is defined in terms of the link strength. Other cell interference cancellation is an efficient way of improving user experience provided that serving channel quality is suitable to acquire and maintain a basic connection to the serving HeNB 102. The following describes a few fundamental challenges on the way to a successful interference cancellation in the existing packet data systems such as LTE Rel-8.

The network 100 can define a reduced set of DL scheduling encoding 160 for a non-serving base station 118. For instance, constrained UE ID sequence 162 can limit the number of blind decoding hypotheses that has to be performed. Alternatively or in addition, confined DL grant resource space 164. Thereby, the UE 106 can employ the downlink cancellation component 110, in particular using a decode DL scheduling component 166 that then supports an interference cancellation/estimation component 168. In another aspect, the serving base station 102 can provide enhancements to interference cancellation by the UE 106 using a downlink cancellation component 108 that uses memory 172 and processor 174 to perform early HARQ terminations component 176, responsive to channel quality reports 178 from the UE 106.

Limiting User Equipment (UE) Identity Space.

In order to demodulate traffic transmission from the non-serving cell 120 provided by the non-serving BS 118, a UE 106 acquires details of downlink scheduling 122 made in the interfering cell(s) 120 such as assigned bandwidth, MCS (Modulation and Coding Scheme), possibly H-ARQ (Hybrid Automatic-Repeat-Request) instance and so forth. This information is typically carried in the downlink grant located in the control zone and targeting another UE 124 served by the interfering cell 120. For instance, downlink grants are transmitted on Physical Downlink Control Channel (PDCCH) in LTE Rel-8. Since downlink grants are typically unicast transmissions targeting a certain UE, encoding (scrambling) of the downlink grant packet in most systems is based on UE identity (e.g. Cell Radio Network Temporary Identity (c-RNTI) in LTE Rel-8), in addition to the cell identity. Hence, a UE 106 that tried to demodulate downlink grants issued by its dominant interferer 118 should consider multiple decoding attempts corresponding to various possible c-RNTI values that could be addressed by its dominant interferer 118.

In particular, the UE 106 can access the reduced scrambling/encoding set of temporary UE IDs (e.g., c-RNTI) 128 along with the cell ID for non-serving BS 118. In one aspect, a reduced set of cell IDs are predefined by cell (e.g., based upon mapping from the cell ID) or a common set predefined across cells. In some instances, the reduced set is allocated and de-allocated in blocks of contiguous IDs. The UE 106 is provisioned with a reduced hypothesis set 132 based in part upon this reduced or constrained UE ID sequence set such as by a predefined set of values installed in advance. Alternatively, the non-serving BS 118 utilizes a backhaul or radio resource control channel 134 to the serving BS 102 for relaying as depicted at 136 on the downlink 112. As another alternative, the non-serving BS 118 can broadcast the reduced set 130 to the UE 106 as depicted at 138. The reduced number of scrambling/encoding possibilities enables the UE 106 to perform a manageable number of hypotheses to decode the DL scheduling, even within processing and power constraints of an economical portable device. After a successful decoding, the UE 106 can cancel the interference.

In an exemplary implementation of LTE (Long Term Evolution) Rel-8, the c-RNTI space is $2^{16}$, while the length of PDCCH CRC (cyclic redundancy check) is 16. Furthermore, PDCCH CRC is scrambled with a sequence generated based on the c-RNTI 128 of the target UE 124. Trying all possible c-RNTI values would always imply a successful CRC pass for one hypothesis regardless of the original content and target UE 124 of that PDCCH thereby leading to a false alarm. Thus, a UE 106 in the neighbor cell 120 served by BS 102 cannot determine the true content of a PDCCH and hence cannot reliably acquire information needed for the subsequent traffic Physical Downlink Shared Channel (PDSCH) demodulation.

It should be appreciated with the benefit of the present disclosure that a communication apparatus, depicted as base station 102 and device 106, can be a wireless terminal. Additionally or alternatively, a communications apparatus can be resident within a wired network. A communications apparatus can include memory 152 that can retain instructions for performing a signal analysis in a wireless communications terminal. Additionally, a communications apparatus may include a processor 154 that can execute instructions within memory 152 and/or instructions received from another network device, wherein the instructions can relate to configuring or operating the communications apparatus or a related communications apparatus.

In the following discussion, a modification is provided to the existing (baseline) air interface design that allows reducing the number of c-RNTI hypotheses. With a properly reduced c-RNTI space, the total number of possible hypotheses and hence false alarms scale with the number of PDCCH resources allocated by the interfering cell. Thus, reduction of the PDCCH (i.e., DL grant resource) search space is also desirable as discussed below. Finally, capacity gains of traffic interference cancellation are contingent upon a reasonably accurate matching of the downlink rate to channel conditions that account for interference cancellation gain. However, accurate advance rate prediction is fundamentally difficult in the absence of cooperation from the interfering cell since neither interfered UE nor its serving cell can generally predict MCS and/or power of the interfering transmission. The following discusses how scheduling can facilitate such capacity gains.

One way to limit the number of c-RNTI hypotheses is to confine the range of usable c-RNTI to a smaller set. In practice, c-RNTI space in use should be sufficient to cover active (active hold) UEs with some provisioning for UEs in the handoff region and probably UEs that have been visiting the cell recently. In many cases, this number can be smaller than the c-RNTI space ($2^{16}$). This is true in home femto deployments where only a few UEs are associated with a particular CSG and the corresponding HeNB. The maximum size of c-RNTI space can be safely confined to e.g., $2^5$ or $2^6$ thereby reducing the number of c-RNTI hypotheses substantially. A reduction in c-RNTI space can be achieved naturally via greedy c-RNTI allocation algorithms such as:

(a) There is a cell-specific sequence of c-RNTI values obtained e.g., via a permutation of the sequence [0, 1, ..., $2^{16}-1$] which permutation is defined by e.g., the cell ID. A cell allocates a new c-RNTI as by taking the minimum logical index within the cell specific sequence that is not in use or has not been used for certain amount of time.

(b) Similar to (A) where the sequence is not cell specific but rather common across all cells.

(c) Similar to (A) or (B) wherein c-RNTI values are allocated in blocks. For instance, a cell can allocate a contiguous block of N c-RNTI values from the above sequence and select the values from this block. When N values are in use, the cell allocates another contiguous block of N values and so forth. Likewise, the cell can de-allocate a block when the number of c-RNTI being in use becomes (substantially) smaller that the number of c-RNTI values in use.

Note that the above approaches do not yield hard constraints on c-RNTI usage. When either of the above (or similar) algorithms are implemented at HeNB, a UE that considers a finite number of c-RNTI hypotheses for other cell PDCCH demodulation can succeed as long as the number of c-RNTI values in use is relatively small. This will be often the case in home femto deployments.

The outlined approach does not generally require any protocol enhancement and can achieve interference cancellation based on a smart algorithm for c-RNTI allocation. Alternatively, HeNBs can exchange the set of c-RNTIs in use (or considered for potential use) so that a serving cell can forward to its UEs the set of c-RNTIs in use by a neighbor. The latter approach would employ enhanced protocols as well as the associated over-the-air signaling overhead. Note that such protocols could also be used to transmit other information that is relevant to demodulating and/or decoding of the interfering signal. In the case of LTE Rel-8, this could be used to transmit traffic-to-pilot ratio (T2P) used for a particular UE for a particular duration of time. Alternately, the set of T2P values used by the interfering eNB may also be chosen in a preferred order.

Limiting Downlink Grant Resource Space.

The total number of downlink control resources, in terms of their location in the control zone as well as the encoding scheme (e.g., the number of modulation symbols per message), is typically quite large. A large total number of decoding hypotheses to be considered by a UE will drive false alarms as well as decoding complexity even if c-RNTI space is limited. The complexity argument becomes relevant for UEs that attempt interference cancellation and therefore try to decode control from one or more non-serving cells, in addition to the serving cell. The effect of false alarm and additional complexity can be alleviated if HeNB limits the number of hypotheses by e.g., (a) Striving to confine downlink grants to the common space PDCCH instances only;

(b) Striving to confine downlink grants to just a few PDCCH instances; and (c) Striving to use only a particular type of PDCCH (e.g. type-4).

Here again, the described considerations do not typically yield hard constraints of PDCCH allocation and will often yield to a successful PDCCH demodulation by a UE that checks a limited number of hypotheses corresponding to all or some of the above conditions. Also note that meeting the above conditions is fairly straightforward for a lightly loaded cell and hence in home femto deployments.

Leveraging Gains Through Early H-ARQ Terminations.

As already mentioned, capacity gains due to interference cancellation should have accurate matching of the downlink traffic transmission rate to the actual interference conditions while advance prediction of the residual interference level and merely the success of interference cancellation is difficult in practice. One way to retain capacity gains is by targeting later H-ARQ terminations for a UE that potentially benefits from interference cancellation. Specifically, a UE that has a strong dominant interferer with potentially high interference cancellation gains can be assigned an MCS and/or power level that yields target termination at the 2nd, 3rd or 4th H-ARQ transmission in the event of unsuccessful interference cancellation. In this case, the channel quality measurement and reporting by the UE would account for the full (un-cancelled) interference. Successful demodulation of the interfering signal and interference cancellation by the UE prior to the target (late) H-ARQ termination can yield an early decoding of the packet hence leading to a higher spectral efficiency. Note that successful demodulation of the interfering signal by the UE early enough, prior to the decoding of its own traffic transmission, can happen more often if the interfering cell targets early termination. For instance, the default Rel-8 DL timeline assumes 4 subframe spacing between DL grant/PDSCH and the corresponding ACK (Acknowledge message). An illustrative relaxing can entail spacing of 6 or 8 subframes to provide additional time for decoding of an interfering signal prior to decoding the targeted signal.

Based on the above observations, the following scheduling policy to leverage interference cancellation gains can be provided:

(a) Serving cell identifies the UEs that can benefit from interference cancellation (C/I), e.g., based on the anticipated C/I improvement due to cancelling one or more dominant interferers. The potential C/I improvement can be assessed based on e.g., pilot strength reports from the UE. For such UEs, the serving cell targets relatively late H-ARQ terminations (e.g., 2nd, 3rd or 4th); and (b) For the remaining UEs, the serving cell targets relatively early H-ARQ terminations, preferably the 1st H-ARQ transmission.

While most of the analysis is carried out in the context of traffic interference cancellation, it should be noted that techniques described above apply to the control interference cancellation as well. It should be also appreciated that the above techniques discussed in the context of LTE Rel-8 design can potentially apply to many other packet data systems such as HSDPA (High Speed Packet Data Access) and WiMax (Worldwide Interoperability for Microwave Access, Inc.). It should be further noted the techniques can be applicable to schemes which involve cancellation prior to decoding (for example, by schemes that estimate the transmitted modulation symbol based on the corresponding received modulation symbol). Also, depending on implementation and traffic type, target H-ARQ termination may correspond to e.g., average, median or other percentages of the number of H-ARQ transmissions.

It is noted that the system 100 can be employed with an access terminal or mobile device, and can be, for instance, a module such as an SD card, a network card, a wireless network card, a computer (including laptops, desktops, and personal digital assistants), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in a memory unit and executed by the processors.

Figure 3:
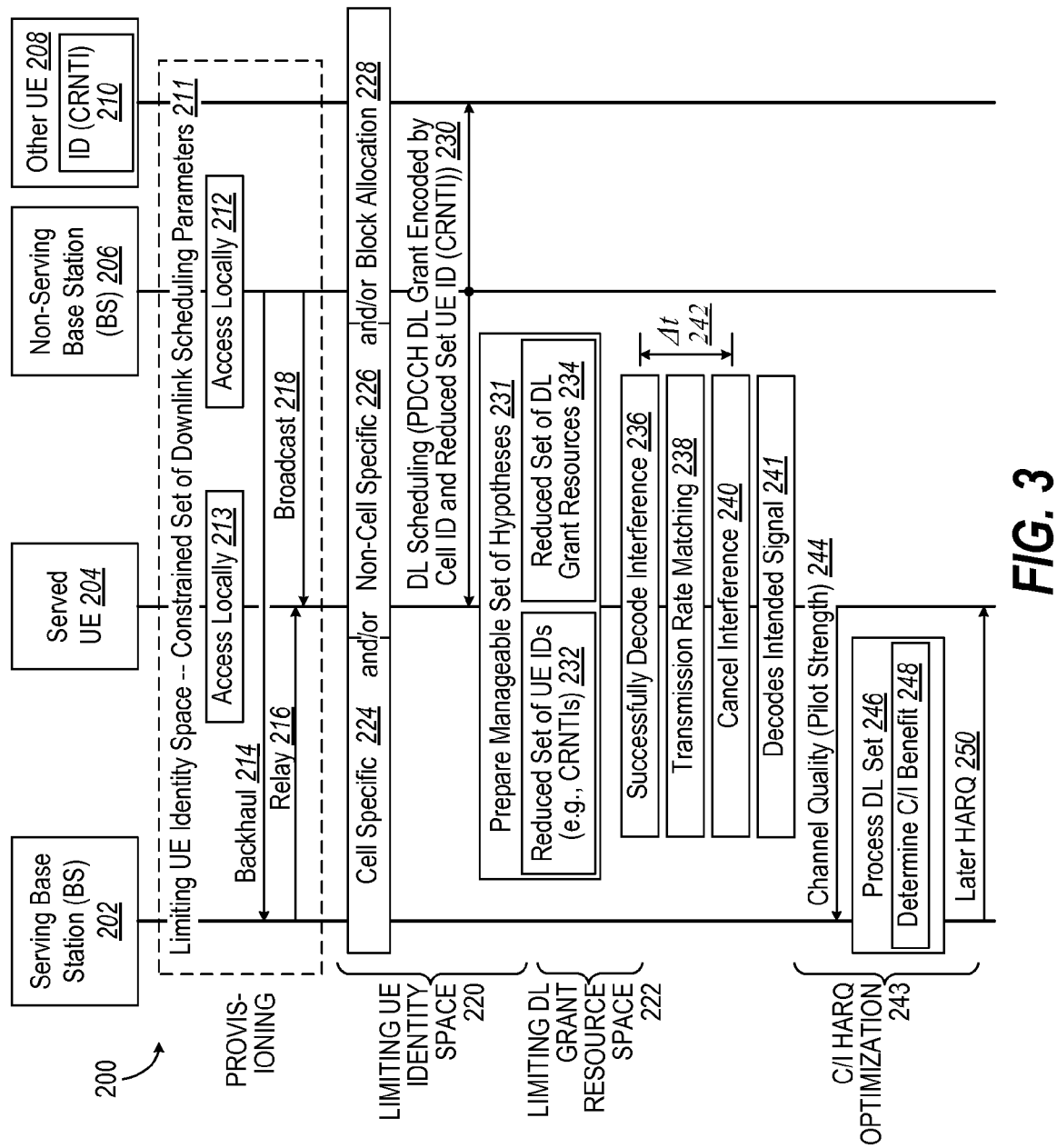
FIG. 3 illustrates a flow diagram of a methodology or sequence of operations for interference mitigation.

In FIG. 3, an illustrative methodology or sequence of operations 200 is performed by a communication system represented by a serving base station (BS) 202, user equipment (UE) 204 and a non-serving BS (e.g., alien femtocell) 206, the latter creating interference for UE 204 in communicating with another UE 208 associated with Identifier ("ID") 210, such as c-RNTI (Cell Radio Network Temporary Identity).

In block 211, the non-serving BS 206 and UE 204 are provided ("provisioned") with a constrained set of downlink scheduling parameters. For example, a predefined constrained set or method of computing the constrained set can be accessed from local storage respectively at the BS 206 in block 212 and UE 204 at block 213. Alternatively or in addition, the non-serving BS 206 can relay these downlink scheduling parameters via a backhaul connection or radio resource channel to the serving BS 202, which in turn relays the parameters on the downlink as depicted respectively at 214, 216. Alternatively or in addition, the non-serving BS 206 can multicast or broadcast the constrained set of downlink parameters directly to the UE 204 (block 218).

In one aspect, these downlink scheduling parameters can comprise a reduced set of values for encoding/scrambling a downlink transmission intended for a target wireless device, depicted as limiting UE identity space (block 220). Alternatively or in addition, a constrained set of downlink scheduling parameters can comprise a reduced set of downlink scheduling grant resources (block 222). With regard to the former, in an exemplary implementation, UE identifiers such as c-RNTIs used for encoding/scrambling for unicasting to the target wireless device are constrained on a cell-specific basis (e.g., based upon a cell ID for the non-serving BS 206) (block 224). Alternatively, the UE identifiers such as c-RNTIs are not constrained in a cell-specific manner, that is they are common across cells (block 226). Whether cell-specific or not, in some instances the set is constrained by allocating and deallocating blocks of contiguous UE IDs, which can further enhance signaling or determining what the constrained set is (block 228).

The UE 204 receives the encoded downlink signal (e.g., traffic, control channel) from the non-serving BS 206 that interferes with an intended signal received from the serving BS 202 (block 230). The interfering signal can be at a higher power, requiring canceling prior to estimating (e.g., decoding) the intended signal. Advantageously, the UE 204 can access the constrained downlink scheduling parameters in order to prepare a manageably small set of hypotheses, one of which can successfully decode the interfering signal (block 231) by one or both of limiting the user equipment (UE) identity space and limiting the downlink grant resource space. In particular, the UE 204 uses a reduced set of UE identifiers to decode/descramble the interfering signal (block 232) provisioned in one of the previously disclosed manners. Alternatively or in addition, the UE 204 achieves a manageably reduced set of hypotheses due to a constrained set of DL grant resources (block 234). With successful decoding (block 236)

and matching of transmission rate between the interfering and intended signals (block 238), the interfering signal can be canceled (block 240).

Since the UE 204 decodes the interfering signal first before decoding the intended signal (block 241), the UE 204 can require more time than otherwise to acknowledge successful or unsuccessful decoding of the intended signal, as depicted at 242. The serving BS 202 can enhance such interference cancellation (C/I) by the UE 204 by providing more time before expecting an acknowledgement or not acknowledged response or performing retransmission, depicted as HARQ Optimization 243. To that end, the UE 204 transmits channel quality reports (e.g., pilot strength) on the uplink (block 244). The serving BS 202 as part of processing a downlink set (block 246) makes a determination that UE 204 would benefit from performing interference cancellation as disclosed herein (block 248). The serving BS 202 assigns a later target termination, such as by hybrid automatic repeat request (HARQ) (block 250).

Figure 4:
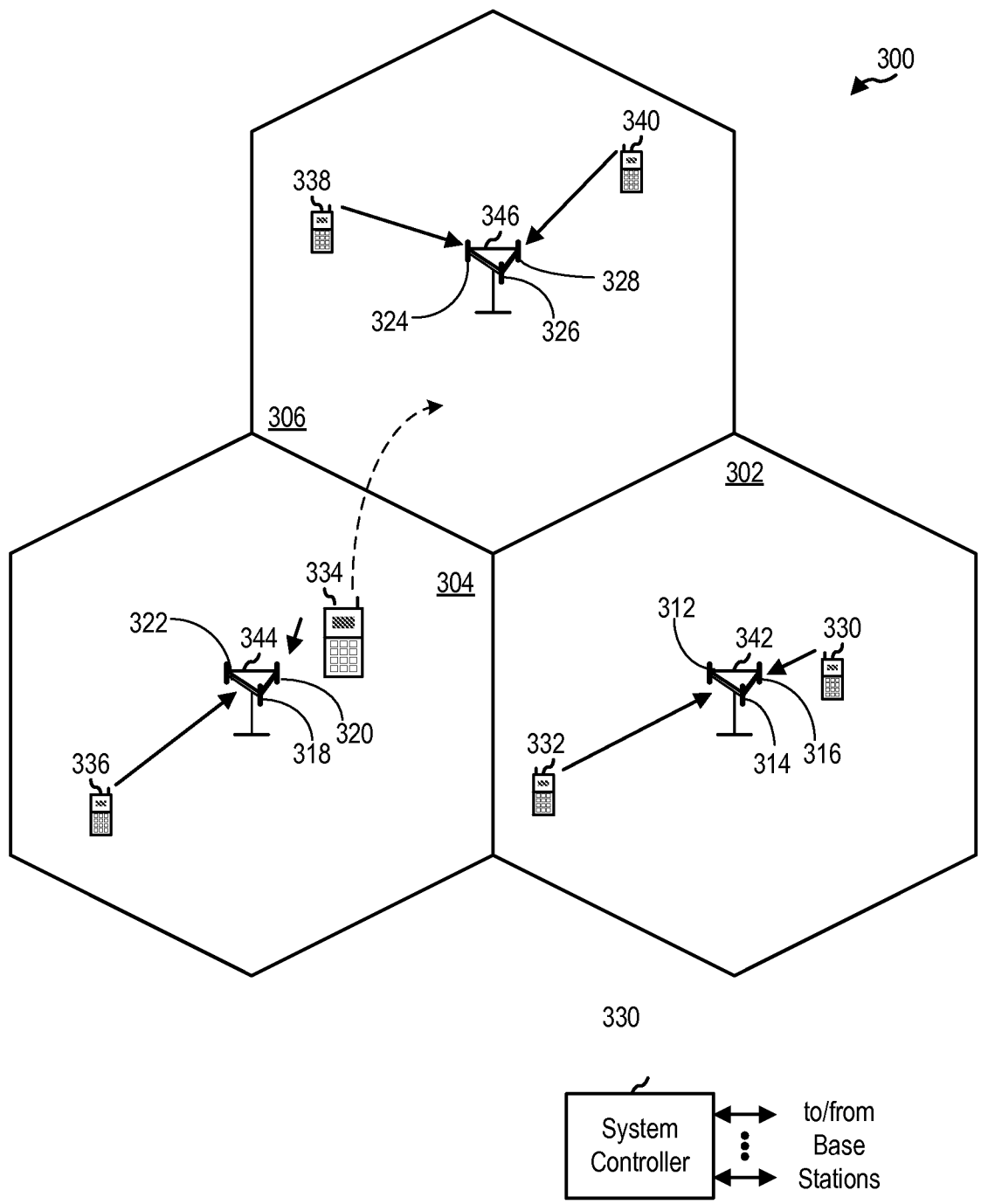
FIG. 4 illustrates a multiple access wireless communication system.

Referring to FIG. 4, a multiple access wireless communication system 300 is illustrated. The multiple access wireless communication system 300 includes multiple cells, including cells 302, 304, and 306. In one aspect, the system 300 has cells 302, 304, and 306 each is served by a Node B that includes multiple sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 can include several wireless communication devices, e.g., User Equipment or UEs, which can be in communication with one or more sectors of each cell 302, 304 or 306. For example, UEs 330 and 332 can be in communication with Node B 342, UEs 334 and 336 can be in communication with Node B 344, and UEs 338 and 340 can be in communication with Node B 346.

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple (NF) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the NF frequency subcarriers. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Figure 5:
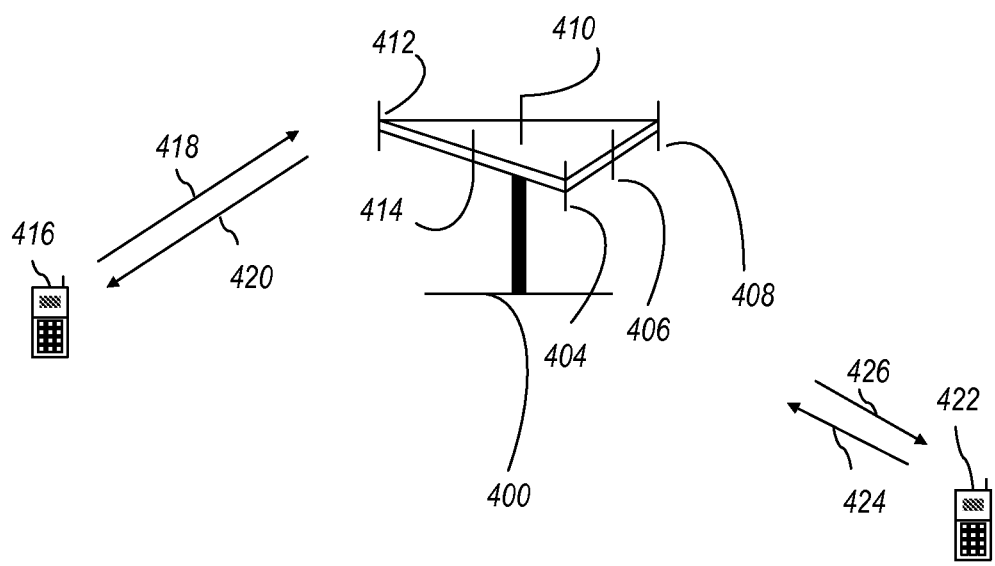
FIGS. 5 and 6 illustrate example communications systems that can be employed with frame structure protocols.

Referring now to FIG. 5, a multiple access wireless communication system according to one aspect is illustrated. An access point 400 (AP) includes multiple antenna groups, one including 404 and 406, another including 408 and 410, and an additional including 412 and 414. In FIG. 5, only two antennas are shown for each antenna group, however, more or fewer antennas may be utilized for each antenna group. Access terminal 416 (AT) is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequencies for communication. For example, forward link 420 may use a different frequency than that used by reverse link 418.

Each group of antennas and/or the area in which they are designed to communicate is often referred to as a sector of the access point. Antenna groups each are designed to communicate to access terminals in a sector, of the areas covered by access point 400. In communication over forward links 420 and 426, the transmitting antennas of access point 400 utilize beam-forming in order to improve the signal-to-noise ratio of forward links for the different access terminals 416 and 422. Also, an access point using beam-forming to transmit to access terminals scattered randomly through its coverage area causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 6:
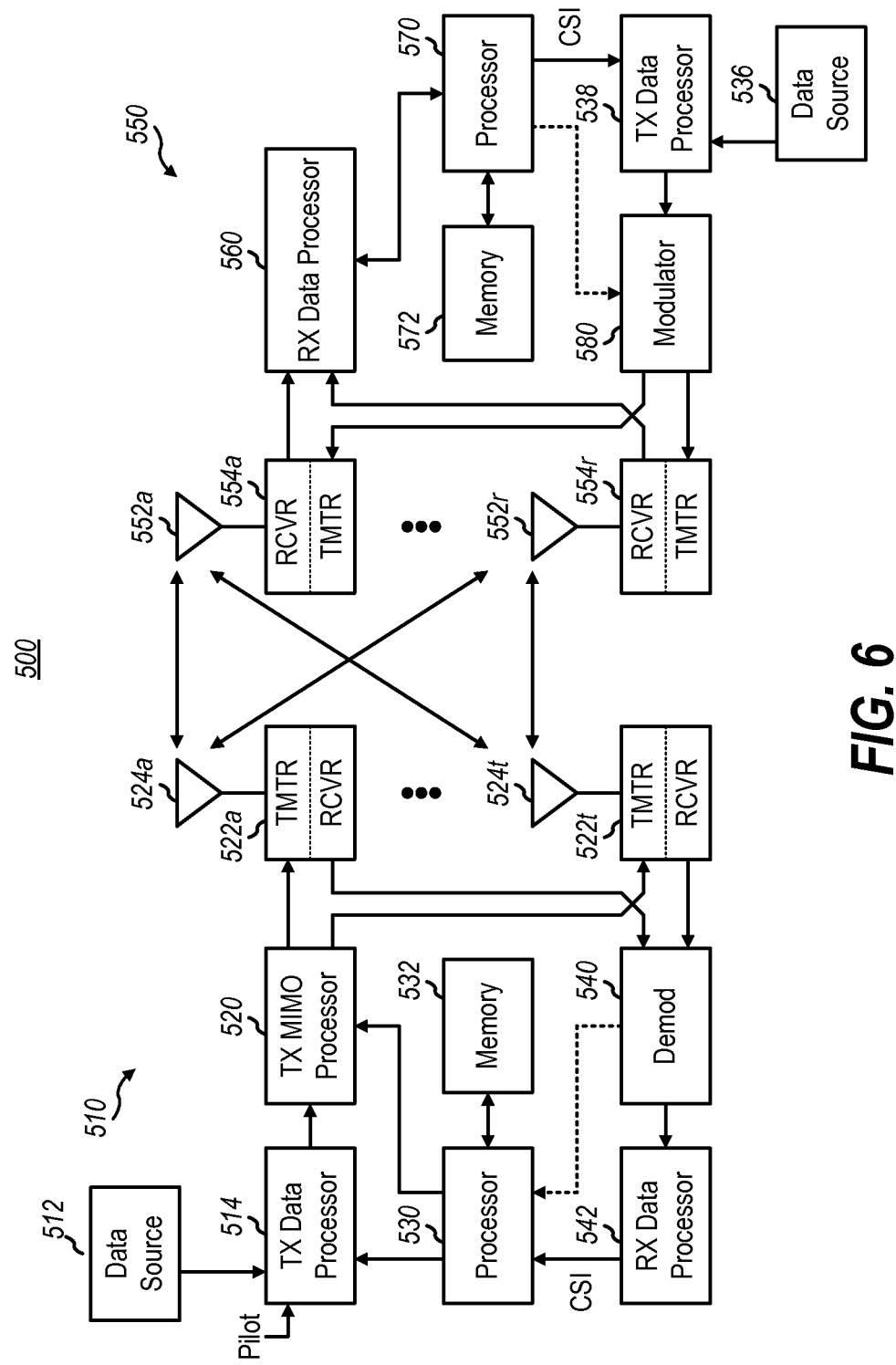

Referring to FIG. 6, a system 500 illustrates a transmitter system 510 (also known as the access point) and a receiver system 550 (also known as access terminal) in a MIMO system 500. At the transmitter system 510, traffic data for a number of data streams is provided from a data source 512 to a transmit (TX) data processor 514. Each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 530 that utilizes memory 532.

The modulation symbols for all data streams are then provided to a TX MIMO processor 520, which may further process the modulation symbols (e.g., for OFDM). TX MIMO processor 520 then provides NT modulation symbol streams to NT transmitters (TMTR) 522a through 522t. In certain embodiments, TX MIMO processor 520 applies beam-forming weights to the symbols of the data streams and to the antenna from which the symbol is being transmitted.

Each transmitter 522 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 522a through 522t are then transmitted from NT antennas 524a through 524t, respectively.

At receiver system 550, the transmitted modulated signals are received by NR antennas 552a through 552r and the received signal from each antenna 552 is provided to a respective receiver (RCVR) 554a through 554r. Each receiver 554 conditions (e.g., filters, amplifies, and down-converts) a respective received signal, digitizes the conditioned signal to provide samples, and further processes the samples to provide a corresponding "received" symbol stream.

An RX data processor 560 then receives and processes the NR received symbol streams from NR receivers 554 based on a particular receiver processing technique to provide NT "detected" symbol streams. The RX data processor 560 then demodulates, de-interleaves, and decodes each detected symbol stream to recover the traffic data for the data stream. The processing by RX data processor 560 is complementary to that performed by TX MIMO processor 520 and TX data processor 514 at transmitter system 510.

A processor 570 periodically determines which pre-coding matrix to use (discussed below). Processor 570 formulates a reverse link message comprising a matrix index portion and a rank value portion utilizing memory 572. The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550. Processor 530 then determines which pre-coding matrix to use for determining the beam-forming weights then processes the extracted message.

In an aspect, logical channels are classified into Control Channels and Traffic Channels. Logical Control Channels comprise a Broadcast Control Channel (BCCH) which is a DL channel for broadcasting system control information. Paging Control Channel (PCCH) which is a DL channel that transfers paging information. Multicast Control Channel (MCCH) which is a Point-to-multipoint DL channel used for transmitting Multimedia Broadcast and Multicast Service (MBMS) scheduling and control information for one or several MTCHs (MBMS point-to-multipoint Traffic Channel). Generally, after establishing RRC (Radio Resource Control) connection, this channel is only used by UEs that receive MBMS (Note: old MCCH+MSCH (MBMS point-to-multipoint Scheduling Channel)). Dedicated Control Channel (DCCH) is a Point-to-point bi-directional channel that transmits dedicated control information used by UEs having an RRC connection. Logical Traffic Channels comprise a Dedicated Traffic Channel (DTCH) which is a Point-to-point bi-directional channel, dedicated to one UE, for the transfer of user information. Also, a Multicast Traffic Channel (MTCH) for a Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over an entire cell and mapped to physical (PHY) resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

Other terms include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access.

Figure 7:
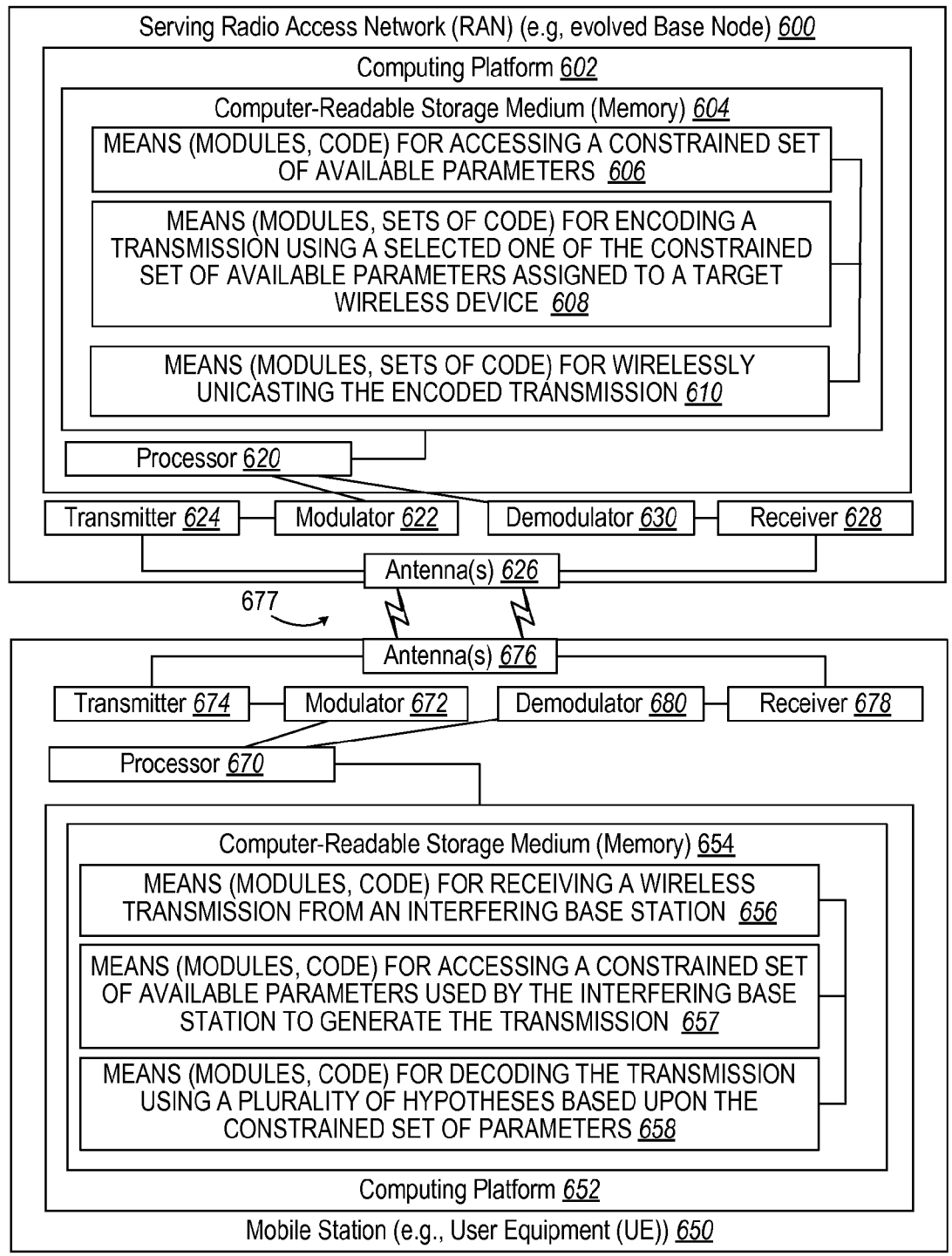
FIG. 7 depicts a block diagram of a base station and user equipment each having a computing platform for performing methods of interference mitigation.

In FIG. 7, a serving radio access network (RAN), depicted as an evolved base node (eNB) 600, has a computing platform 602 that provides means such as sets of codes for causing a computer to enable a wireless device to mitigate interference in a wireless communication system. In particular, the computing platform 602 includes a computer readable storage medium (e.g., memory) 604 that stores a plurality of modules 606-610 executed by a processor(s) 620. A modulator 622 controlled by the processor 620 prepares a downlink signal for modulation by a transmitter 624, radiated by antenna(s) 626. A receiver 628 receives uplink signals from the antenna(s) 626 that are demodulated by a demodulator 630 and provided to the processor 620 for decoding. In particular, means (e.g., module, set of codes) 606 are provided for accessing a constrained set of available parameters. Means (e.g., modules, sets of codes) 608 are provided for encoding a transmission using a selected one of the constrained set of available parameters assigned to a target wireless device. Means (e.g., modules, sets of codes) 610 are provided for wirelessly unicasting the transmission, wherein the constrained set of parameters is selected to be sufficient for a non-served user equipment (UE) to decode the transmission using a plurality of hypotheses based upon the constrained set of resources.

With continued reference to FIG. 7, a mobile station, depicted as user equipment (UE) 650, has a computing platform 652 that provides means such as sets of codes for mitigating interference in a wireless communication system. In particular, the computing platform 652 includes a computer readable storage medium (e.g., memory) 654 that stores a plurality of modules 656-658 executed by a processor(s) 670. A modulator 672 controlled by the processor 670 prepares an uplink signal for modulation by a transmitter 674, radiated by antenna(s) 676 as depicted at 677 to the eNB 600. A receiver 678 receives downlink signals from the eNB 600 from the antenna(s) 676 that are demodulated by a demodulator 680 and provided to the processor 670 for decoding. In particular, means (e.g., modules, sets of codes) 656 are provided for receiving a wireless transmission from an interfering base station. Means (e.g., modules, sets of codes) 657 are provided for accessing a constrained set of available parameters used by the interfering base station to generate the transmission. Means (e.g., modules, sets of codes) 658 are provided for decoding the transmission using a plurality of hypotheses based upon the constrained set of downlink scheduling parameters.

Figure 8:
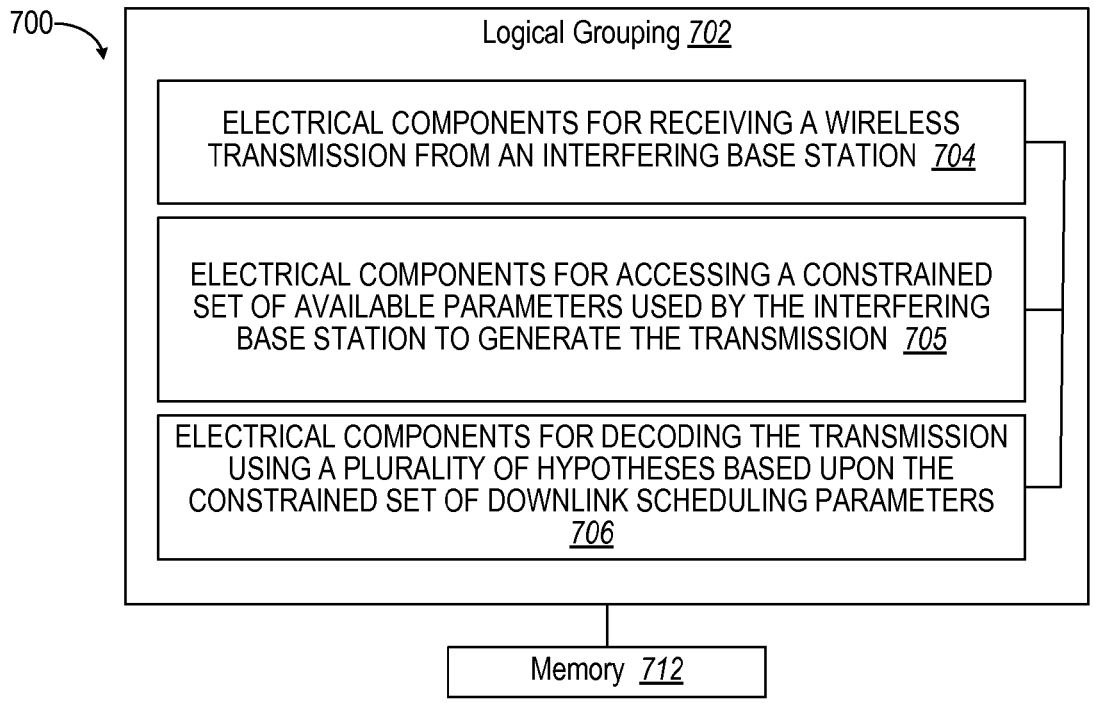
FIG. 8 depicts a block diagram of a system having a logical grouping of electrical components for performing frame structure protocols.

With reference to FIG. 8, illustrated is a system 700 that mitigates interference in a wireless communication system. For example, system 700 can reside at least partially within user equipment (UE). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for receiving a wireless transmission from an interfering base station 704. Moreover, logical grouping 702 can include an electrical component for accessing a constrained set of available parameters used by the interfering base station to generate a transmission 705. Further, logical grouping 702 can include an electrical component for decoding the transmission using a plurality of hypotheses based upon the constrained set of parameters 706. Additionally, system 700 can include a memory 712 that retains instructions for executing functions associated with electrical components 704-706. While shown as being external to memory 712, it is to be understood that one or more of electrical components 704-706 can exist within memory 712.

Figure 9:
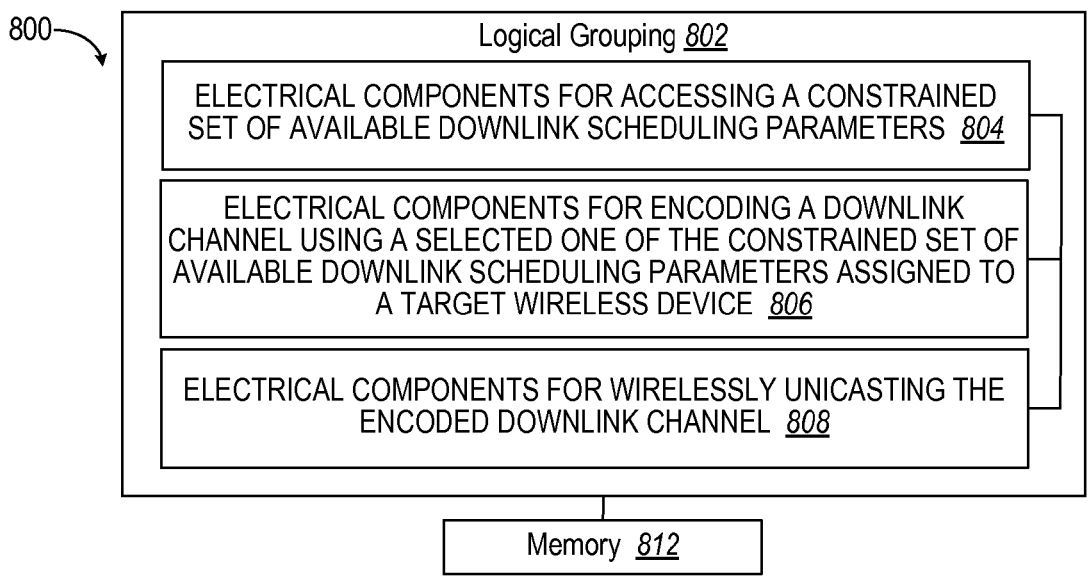
FIG. 9 depicts a block diagram of a system having a logical grouping of electrical components for frame structure protocols.

With reference to FIG. 9, illustrated is a system 800 that enables a wireless device to mitigate interference in a wireless communication system. For example, system 800 can reside at least partially within a base station. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction.

For instance, logical grouping 802 can include an electrical component for accessing a constrained set of available parameters 804. In addition, logical grouping 802 can include an electrical component for encoding a transmission using a selected one of the constrained set of available parameters assigned to a target wireless device 806. Further, logical grouping 802 can include an electrical component for wirelessly unicasting the encoded transmission 808, wherein the constrained set of parameters is selected to be sufficient for a non-served user equipment (UE) to decode the transmission using a plurality of hypotheses based upon the constrained set of resources. Additionally, system 800 can include a memory 812 that retains instructions for executing functions associated with electrical components 804, 806 and 808. While shown as being external to memory 812, it is to be understood that one or more of electrical components 804, 806 and 808 can exist within memory 812.

By virtue of the foregoing, systems and methods are provided to mitigate downlink interference in a wireless communication system. In one aspect, a method to mitigate interference in wireless system is provided. The method includes processing a set of radio network identifiers and limiting a number of hypotheses associated with the radio network identifiers in order to mitigate interference in a wireless network. In another aspect, the method includes processing a set of hypotheses and limiting the set of hypotheses by limiting a number of downlink grants to a common space, limiting the number of downlink grants to a number of instances, or limiting the number of grants to a physical downlink control channel (PDCCH) type. In yet another aspect, the method includes processing a downlink set and generating a target termination level for the downlink data set, the termination level associated with a Hybrid automatic repeat-request.

In FIG. 10, an apparatus 902 such as user equipment (UE) is provided with means for performing mitigating interference cancellation in a wireless communication system. Means 904 are provided for receiving a wireless transmission from an interfering base station. Means 906 are provided for accessing a constrained set of available parameters used by the interfering base station to generate the transmission. Means 908 are provided for decoding the transmission using a plurality of hypotheses based upon the constrained set of parameters.

In FIG. 11, an apparatus 1002 is provided for enabling a wireless device to mitigate interference in a wireless communication system. Means 1004 is provided for accessing a constrained set of available parameters. Means 1006 is provided for encoding a transmission using a selected one of the constrained set of available parameters assigned to a target wireless device. Means 1008 are provided wirelessly unicasting the transmission, wherein the constrained set of parameters is selected to be sufficient for a non-served user equipment (UE) to decode the transmission using a plurality of hypotheses based upon the constrained set of resources.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for mitigating interference in a wireless communication system, comprising:
    receiving an interfering wireless transmission from an interfering base station;
    accessing a constrained set of available parameters used by the interfering base station to generate the interfering wireless transmission; and
    decoding, at a user equipment (UE), the interfering wireless transmission using a reduced plurality of hypotheses based upon the constrained set of parameters.

2. The method of claim 1, wherein the interfering wireless transmission is an assignment grant message.

3. The method of claim 2, wherein the available parameters include the resources to transmit the assignment grant message.

4. The method of claim 2, further comprising using the decoded assignment grant message to obtain parameters about a scheduled data transmission.

5. The method of claim 4, further comprising estimating the data transmission by the user equipment (UE).

6. The method of claim 5, further comprising estimating the data transmission by decoding the data transmission.

7. The method of claim 4, further comprising canceling the estimated transmission at the user equipment (UE).

8. The method of claim 1, wherein the interfering wireless transmission is a control channel or a data channel.

9. The method of claim 1, wherein available parameters include a user equipment (UE) identifier; and the UE identifier is constrained to a preferred set of values.

10. The method of claim 1, further comprising accessing the constrained set of possible radio network identifiers from local storage.

11. The method of claim 1, further comprising wirelessly accessing the constrained set of available parameters from a serving base station relayed from the interfering base station.

12. The method of claim 1, further comprising wirelessly accessing the constrained set of available parameters from a broadcast channel from the interfering base station.

13. The method of claim 1, further comprising constraining the set of available parameters by limiting user equipment identity space used to encode the transmission.

14. The method of claim 13, wherein the limited user equipment identity space is cell specific based upon a cell identifier of the interfering base station.

15. The method of claim 13, wherein the limited user equipment identity space is non-cell specific.

16. The method of claim 13, wherein the limited user equipment identity space is allocated and de-allocated in blocks of target device identifiers wherein each block comprises a relatively small fraction of the total available space.

17. The method of claim 13, wherein the limited user equipment identity space comprises cell radio network temporary identity (c-RNTI) values.

18. The method of claim 1, wherein the interfering base station comprises a femto cell home base station.

19. The method of claim 1, further comprising constraining the set of available parameters by limiting downlink grant resource space.

20. The method of claim 19, further comprising limiting downlink grant resource space to a common space.

21. The method of claim 19, further comprising limiting downlink grant resource space to a specified number of instances selected to support service provided by a femto cell home base station.

22. The method of claim 19, further comprising limiting downlink grant resource space to one of a plurality of types of downlink control channels.

23. The method of claim 1, further comprising canceling traffic transmissions.

24. The method of claim 1, further comprising canceling control channel transmission.

25. The method of claim 1, further comprising:
reporting pilot strength indicative of a benefit of interference cancellation; and
receiving a target termination associated with hybrid automatic repeat-request later than for another wireless device reporting pilot strength less indicative of a benefit of interference cancellation,
wherein the constrained set of available downlink scheduling parameters comprises a reduced set of target device identifiers used to encode the interfering signal and comprises a reduced set of available downlink grants.

26. The method of claim 1, further comprising receiving an assigned hybrid automatic repeat request (HARQ) relaxed for sufficient time for interference cancellation.

27. A computer program product for mitigating interference in a wireless communication system, comprising:
a computer-readable storage medium comprising:
a set of codes for causing a computer to receive an interfering wireless transmission from an interfering base station;
a set of codes for causing the computer to access a constrained set of available parameters used by the interfering base station to generate the interfering wireless transmission; and
a set of codes for causing the computer to decode the interfering wireless transmission at a user equipment (UE) using a reduced plurality of hypotheses based upon the constrained set of parameters.

28. An apparatus for mitigating interference in a wireless communication system, comprising:
means for receiving an interfering wireless transmission from an interfering base station;
means for accessing a constrained set of available parameters used by the interfering base station to generate the interfering wireless transmission; and
means for decoding the interfering wireless transmission at a user equipment (UE) using a reduced plurality of hypotheses based upon the constrained set of parameters.

29. An apparatus for mitigating interference in a wireless communication system, comprising:

a receiver for receiving an interfering wireless transmission from an interfering base station;
a computing platform for accessing a constrained set of available parameters used by the interfering base station to generate the interfering wireless transmission; and
a decoder for decoding the interfering wireless transmission at a user equipment (UE) using a reduced plurality of hypotheses based upon the constrained set of parameters.

30. The apparatus of claim 29, wherein the interfering wireless transmission is an assignment grant message.

31. The apparatus of claim 30, wherein the available parameters include the resources to transmit the assignment grant message.

32. The apparatus of claim 30, wherein the computing platform is further for using the decoded assignment grant message to obtain parameters about a scheduled data transmission.

33. The apparatus of claim 32, wherein the computing platform is further for estimating the data transmission by the user equipment (UE).

34. The apparatus of claim 33, wherein the computing platform is further for estimating the data transmission by decoding the data transmission.

35. The apparatus of claim 32, wherein the computing platform is further for canceling the estimated transmission at the user equipment (UE).

36. The apparatus of claim 29, wherein the interfering wireless transmission is a control channel or a data channel.

37. The apparatus of claim 29, wherein available parameters include a user equipment (UE) identifier; and the UE identifier is constrained to a preferred set of values.

38. The apparatus of claim 29, wherein the computing platform is further for accessing the constrained set of possible radio network identifiers from local storage.

39. The apparatus of claim 29, wherein the receiver is further for wirelessly accessing the constrained set of available parameters from a serving base station relayed from the interfering base station.

40. The apparatus of claim 29, wherein the receiver is further for wirelessly accessing the constrained set of available parameters from a broadcast channel from the interfering base station.

41. The apparatus of claim 29, wherein the computing platform is further for constraining the set of available parameters by limiting user equipment identity space used to encode the transmission.

42. The apparatus of claim 41, wherein the limited user equipment identity space is cell specific based upon a cell identifier of the interfering base station.

43. The apparatus of claim 41, wherein the limited user equipment identity space is non-cell specific.

44. The apparatus of claim 41, wherein the limited user equipment identity space is allocated and de-allocated in blocks of target device identifiers wherein each block comprises a relatively small fraction of the total available space.

45. The apparatus of claim 41, wherein the limited user equipment identity space comprises cell radio network temporary identity (c-RNTI) values.

46. The apparatus of claim 29, wherein the interfering base station comprises a femto cell home base station.

47. The apparatus of claim 29, wherein the computing platform is further for constraining the set of available parameters by limiting downlink grant resource space.

48. The apparatus of claim 47, wherein the computing platform is further for limiting downlink grant resource space to a common space.

49. The apparatus of claim 47, wherein the computing platform is further for limiting downlink grant resource space to a specified number of instances selected to support service provided by a femto cell home base station.

50. The apparatus of claim 47, wherein the computing platform is further for limiting downlink grant resource space to one of a plurality of types of downlink control channel.

51. The apparatus of claim 29, wherein the computing platform is further for canceling traffic transmissions.

52. The apparatus of claim 29, wherein the computing platform is further for canceling control channel transmission.

53. The apparatus of claim 29, further comprising: a transmitter for reporting pilot strength indicative of a benefit of interference cancellation,
- wherein the receiver is further for receiving a target termination associated with hybrid automatic repeat-request later than for another wireless device reporting pilot strength less indicative of a benefit of interference cancellation,
- wherein the constrained set of available downlink scheduling parameters comprises a reduced set of target device identifiers used to encode the interfering signal and comprises a reduced set of available downlink grants.

54. The apparatus of claim 29, further comprising receiving an assigned hybrid automatic repeat request (HARQ) relaxed for sufficient time for interference cancellation.

* * * * *